(12) United States Patent
Lai

(10) Patent No.: US 6,325,400 B1
(45) Date of Patent: Dec. 4, 2001

(54) TREADLE-TYPE VEHICLE BODY FORWARD DRIVE STRUCTURE

(76) Inventor: Chin-Chou Lai, No. 365, Sec. 1, Chung-Shan Road, Hua-Tarn Hsiang, Chang-Hua Hsien (TW)

( * ) Notice: Subject to any disclaimer, the term of this patent is extended or adjusted under 35 U.S.C. 154(b) by 0 days.

(21) Appl. No.: 09/717,079

(22) Filed: Nov. 22, 2000

(51) Int. Cl.[7] ..................................................... B62M 1/00
(52) U.S. Cl. .......................... 280/253; 280/221; 280/254; 280/258; 74/512
(58) Field of Search ..................................... 280/252, 253, 280/255, 258, 221, 251, 254, 256, 257, 210; 74/512, 540, 413, 89.18

(56) References Cited

U.S. PATENT DOCUMENTS

| | | | |
|---|---|---|---|
| 3,984,129 | * 10/1976 | Hege | 280/251 |
| 4,493,671 | * 1/1985 | Kennedy et al. | 446/464 |
| 4,582,342 | * 4/1986 | Lew et al. | 280/221 |
| 4,779,863 | * 10/1988 | Yang | 272/114 |
| 4,915,403 | * 4/1990 | Wiold et al. | 280/221 |
| 5,280,935 | * 1/1994 | Sobocan | 280/221 |
| 6,241,269 | * 6/2001 | Fan | 280/265 |

* cited by examiner

*Primary Examiner*—Anne Marie Boehler
*Assistant Examiner*—Daniel Yeagley
(74) *Attorney, Agent, or Firm*—Dougherty & Troxell

(57) ABSTRACT

A treadle-type vehicle body forward drive structure comprised of a base plate, a transmission assembly and a treadle structure installed onto the base plate, a gear assembly enmeshing the transmission assembly to the treadle structure, and a position limiting plate that maintains the position of the drive structure on the base plate, with the extending ends of the transmission assembly follower shaft installed to the wheel hubs of the vehicle body rear wheels. When the treadle rod is tamped slightly downwards, a slant-cut fan gear of the treadle structure causes a slant-cut gear and a straight-cut gear of the gear assembly to synchronously rotate, at which time since the straight-cut gear of the gear assembly is enmeshed with a straight-cut gear of the transmission assembly, they in combination cause the rotation of the follower shaft and, furthermore, the synchronous rotation of the rear wheels. As such, the user is provided riding pleasure and options.

1 Claim, 5 Drawing Sheets

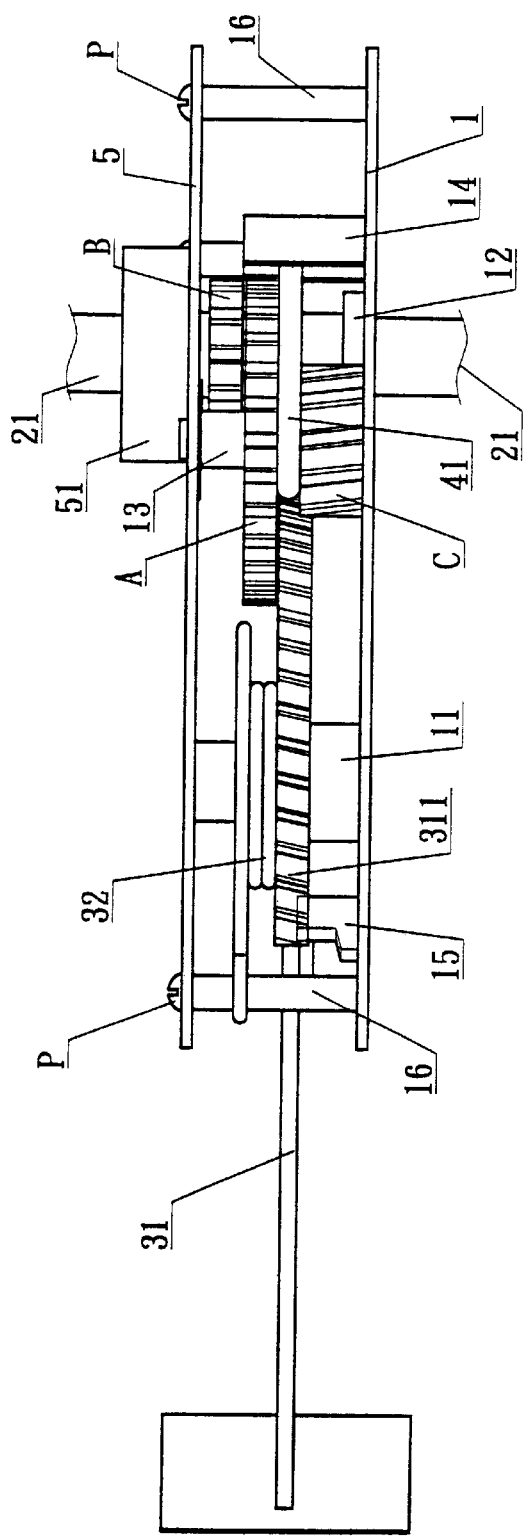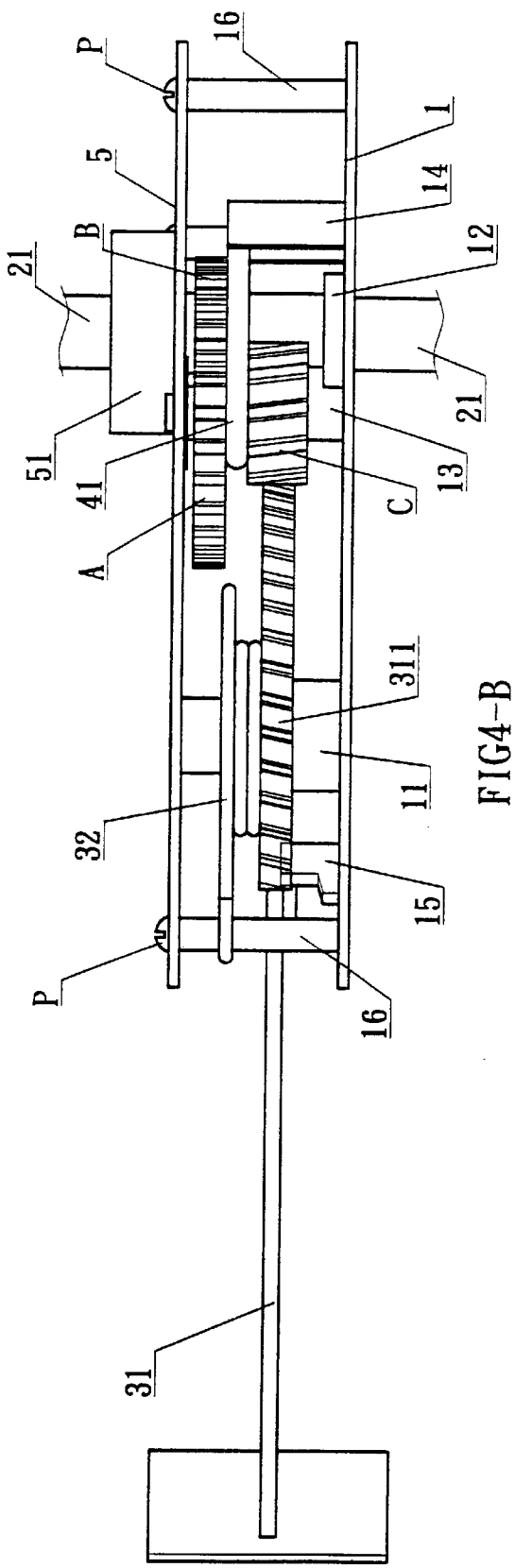
FIG4-A
FIG4-B

TREADLE-TYPE VEHICLE BODY FORWARD DRIVE STRUCTURE

BACKGROUND OF THE INVENTION

1) Field of the Invention

The invention herein relates to a treadle-type vehicle body forward drive structure assembled to the lateral ends of vehicle body rear wheels below the lower platform thereof and, furthermore, in which the treadle rod extends upward to provide the user a means of one-footed reciprocal treadling to impel the vehicle body forward; the present invention is comprised of a transmission assembly and a treadle structure respectively installed onto a base plate, a gear assembly situated between the transmission assembly and a treadle structure and, furthermore, enmeshing the two assemblies, a position limiting plate maintaing the position of the drive structure on the base plate, with the projecting ends of the transmission assembly follower shaft installed to the wheel hubs of the vehicle body rear wheels to drive the vehicle body forward; when the treadle rod is tamped slightly downwards, the tooth surfaces of the treadle structure slant-cut fan gear causes the movement of a slant-cut gear and a straight-cut gear A of the gear assembly such that the gear assembly brings the straight-cut gear A into a state of enmeshment with a straight-cut gear B of the transmission assembly (at which time the gear assembly is still not revolving) to give rise to buffered travel; when the treadle rod is continuously treadled, the slant-cut fan gear of the treadle structure causes the slant-cut gear and straight-cut gear A of the gear assembly to synchronously rotate, at which time the straight-cut gear A of the gear assembly is enmeshed with the straight-cut gear B of the transmission assembly, which in combination cause the revolution of the follower shaft and synchronous rotation of the rear wheels; as such, different states of forward driven vehicle body performance provide the user riding pleasure and options.

2) Description of the Prior Art

Conventional simple-type vehicle body forward drive structures are capable of providing the user options and only skateboards among such types of vehicles do not meet the present demand for diversification and, in view of this, the inventor of the invention herein conducted research, conducted extensive testing, and incorporated numerous improvements which culminated in the successful development of a treadle-type vehicle body forward drive structure that provides the user riding pleasure and options.

SUMMARY OF THE INVENTION

The primary objective of the invention herein is to provide an additional treadle-type vehicle body forward drive structure for users comprised of a transmission assembly and a treadle structure respectively installed onto a base plate, a gear assembly enmeshing the transmission assembly to the treadle structure, and a position limiting plate that maintains the position of the drive structure on the base plate; when the treadle rod is tamped slightly downwards, the tooth surfaces of the treadle structure slant-cut fan gear moves a slant-cut gear A of the gear assembly such that the gear assembly causes the straight-cut gear A to be in a state of enmeshment with a straight-cut gear B of the transmission assembly, which in combination causes the revolution of the follower shaft and synchronous rotation of the rear wheels; as such different states of forward driven vehicle body performance provide the user riding pleasure and options.

To enable the examination committee a further understanding of the structure, innovative features, functions, and other practical objectives of the invention herein, the brief description of the drawings below are followed by the detailed description of invention.

BRIEF DESCRIPTION OF THE DRAWINGS

FIG. 1A is an isometric drawing of the gear assembly as viewed from an inverted perspective.

FIG. 4A is an orthographic drawing of the invention herein depicting operation during the motionless state.

FIG. 4B is an orthographic drawing of the invention herein depicting operation during the ridden state.

DETAILED DESCRIPTION OF THE INVENTION

Figure 1:
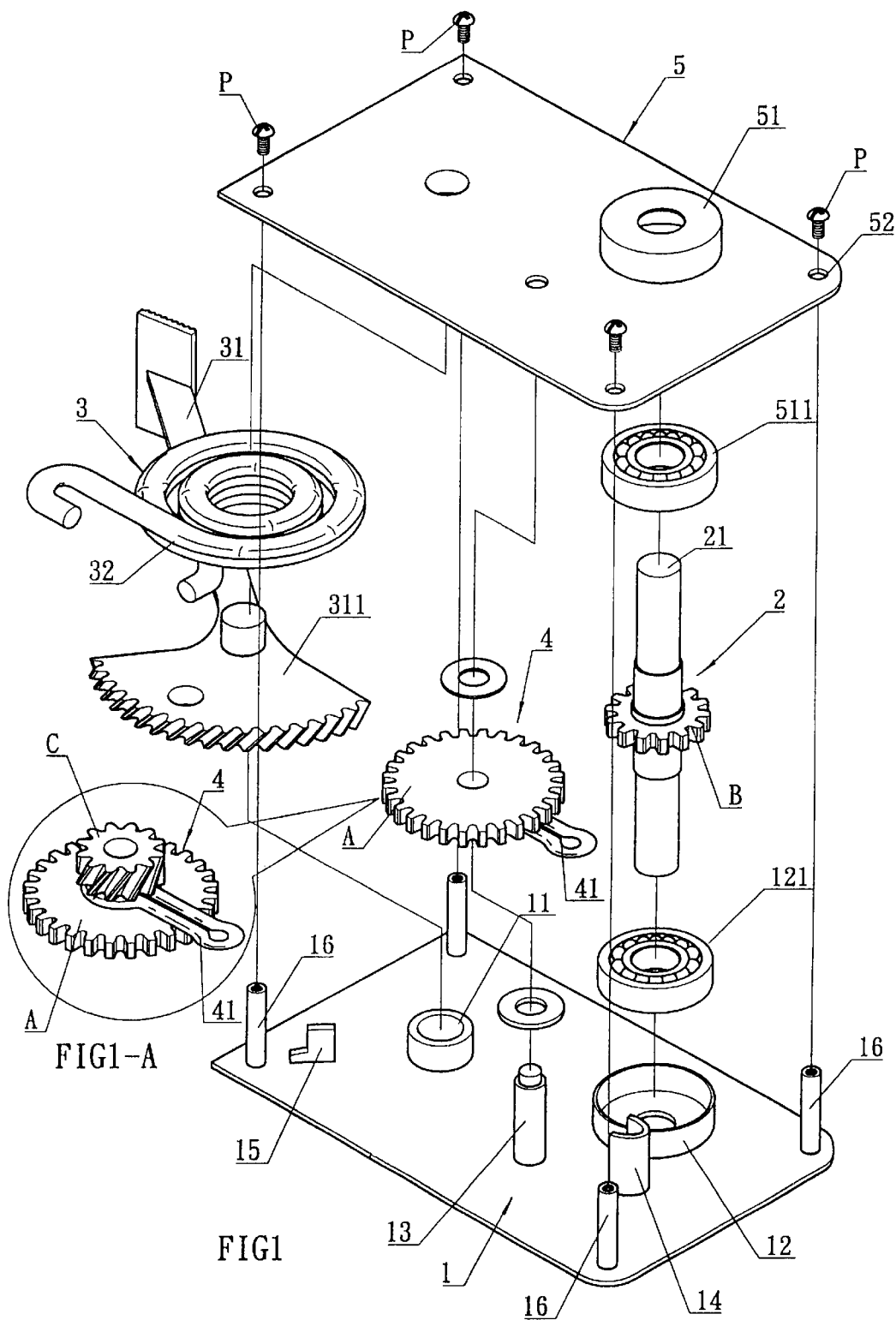
FIG. 1 is an exploded drawing of the invention herein.
Figure 2:
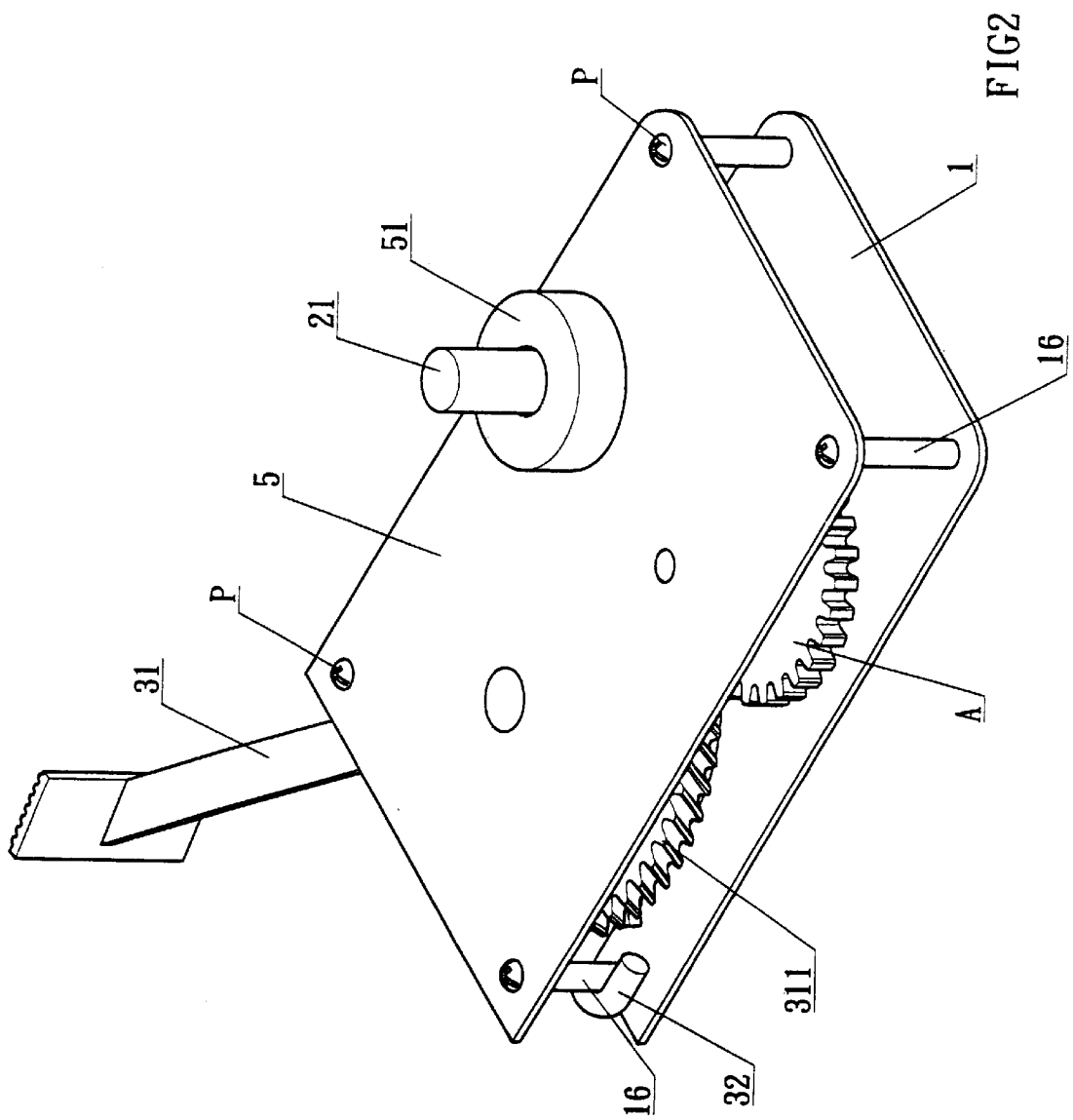
FIG. 2 is an isometric drawing of the assembled invention herein.
Figure 3:
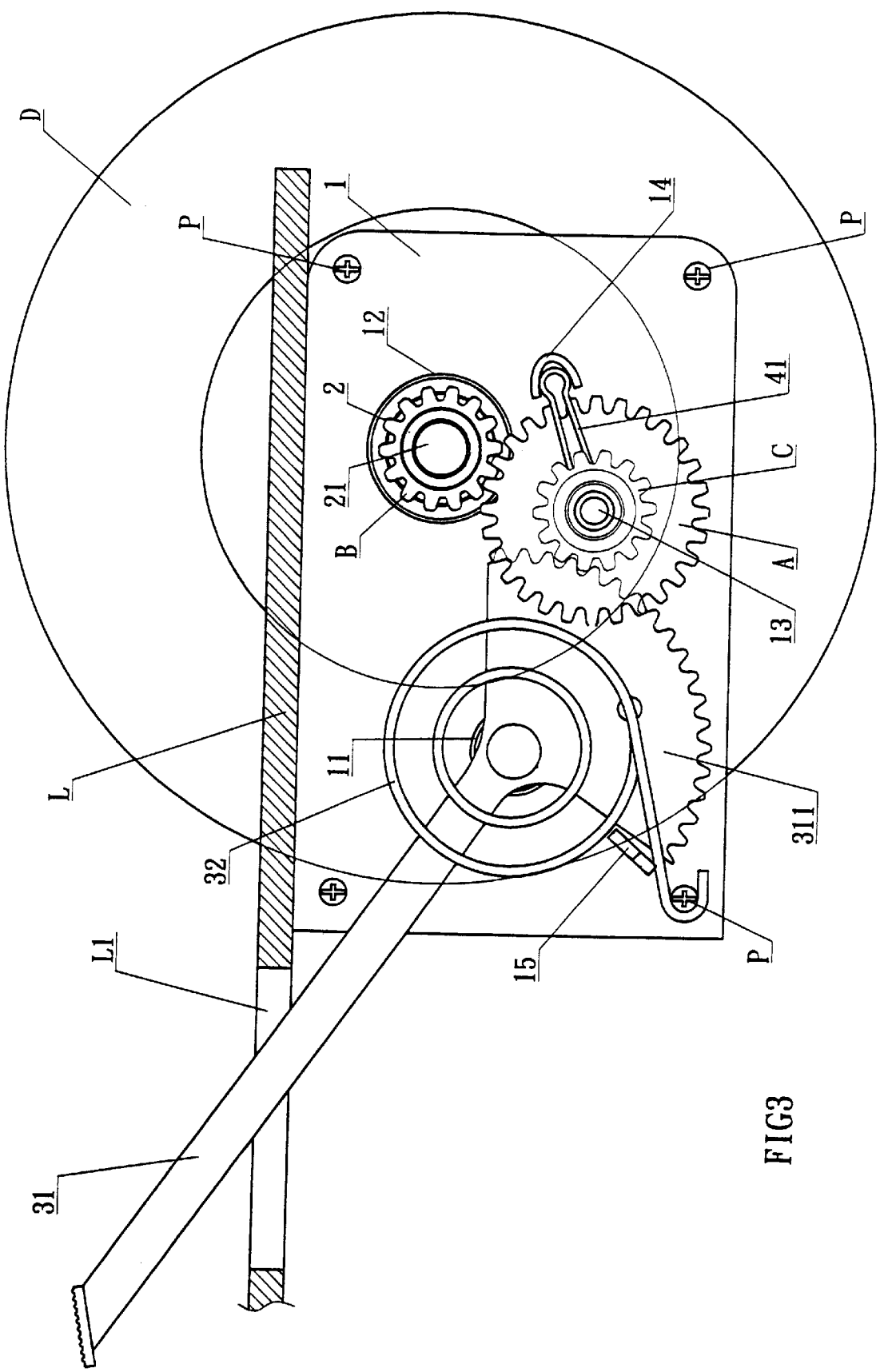
FIG. 3 is an orthographic drawing of the invention herein as viewed from the top.
Figure 5:
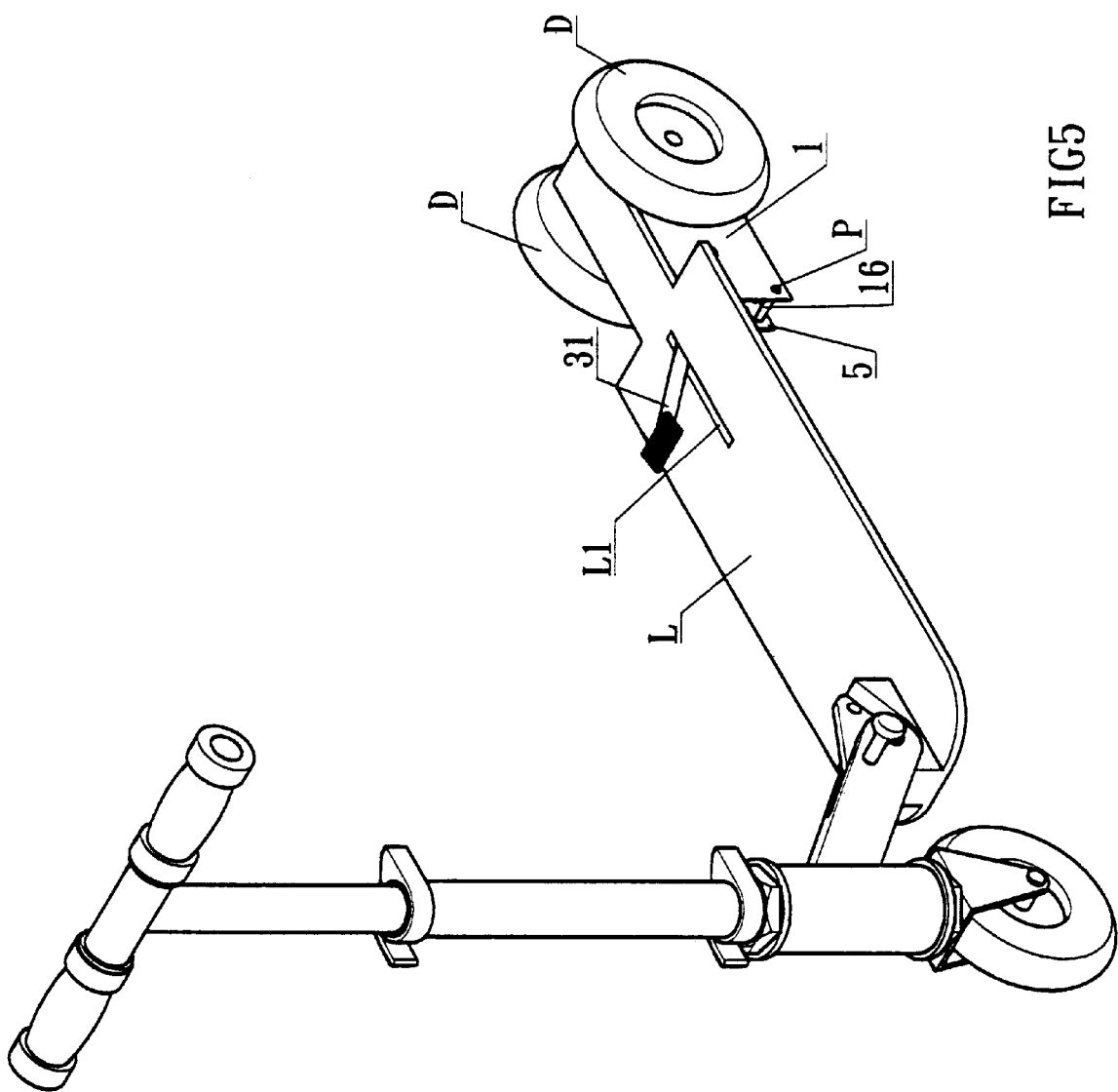
FIG. 5 is an isometric drawing of an embodiment of the invention herein as installed at the rear wheels.

Referring to FIG. 1 and FIG. 2, the structural arrangement of the invention herein is comprised of a base plate 1, a transmission assembly 2 and a treadle structure 3 installed onto the base plate 1, a gear assembly 4 enmeshing the transmission assembly 2 to the treadle structure 2, and a position limiting plate 5 that maintains the position of the drive structure on the base plate 1, of which:

The said base plate 1 has respectively disposed on its interior surface a fixing mount 11 and a bearing mount 12, wherein the center of the fixing mount 11 accommodates the insertion of the treadle structure 3 and installed in the bearing 121 situated on the bearing mount 12 is the transmission assembly 2; also projecting between the two mounts is a fixing rod 13 and a position limiting mount 14 that provide for the inserting into position of the gear assembly 4; situated on the base plate 1 at the coinciding position of the treadle structure 3 slant-cut fan gear 311 is an arresting edge 15 that positionally limits the ascending angle of the treadle rod 31 and, furthermore, protruding from the ends of the base plate 1 are fastening mounts 16 that provide for the insertion of screws P into the through-holes 52 of the position limiting plate 5 and their installation into the fastening mounts 16 to achieve mounting.

The transmission assembly 2 consists of a follower shaft 21 inserted over the base plate 1 bearing mount 12 and a straight-cut gear B ensleeved over the follower shaft 21; the ends of the follower shaft 21 projecting from the position limiting plate 5 are sleeved into the wheel hub centers of the vehicle body rear wheels D and capable of causing the rear wheels D to rotate.

The said treadle structure 3 consists of a treadle rod 31 sleeved onto the base plate 1 fixing mount 12, a torque spring with one end hooked onto a fastening mount 16 of the base plate 1 and the other end hooked 32 on the treadle structure 3 slant-cut fan gear 311, wherein the end of one extremity of the said treadle rod 31 is situated against the base mount arresting edge 15 over the slant-cut fan gear 311 to positionally limit the ascending angle of the treadle rod 31; the other end extends centrally from an elongated hole L1 situated in the middle section of a vehicle body lower platform L to thereby provide for treadling by the foot of the user, when the slant-cut fan gear 311 is in a motionless state, its teeth enmesh the slant-cut gear C of the gear assembly 4 and the pitched edges of the slant-cut teeth of the said fan gear 311 are capable of moving the gear assembly 4.

The said gear assembly 4 is inserted onto the fixing rod 12 of the base plate 1 and enmeshed with a straight-cut gear B of the transmission assembly 2 and the slant-cut fan gear 311 of the treadle structure 3 and, furthermore, the gear assembly 4 consists of a synchronously revolving straight-cut gear A assembled over the slant-cut gear C, with a locating element 41 situated in between the said two gears at their approximate axial centers and, furthermore, the locating element 41 is secured in the position limiting mount 14 of the base plate 1, but permits the gear assembly 4 to ascend and give rise to buffered travel.

The said position limiting plate 5 is sleeved onto the transmission assembly 2 where it is installed in the bearing mount 51 and, furthermore, a bearing 511 is installed between the transmission assembly 2 and the bearing mount 51 to facilitate the rotation of the follower shaft 21; furthermore, base plate 1 fastening mounts 16 are situated at the four end corners of the plate body, with each having a respective through-hole 52 such that after the screws P are inserted, they are screwed into the fastening mounts 16 of the base plate 1 to attach and fix the base plate 1 to the position limiting plate 5.

Referring to FIG. 3, FIG. 4A, FIG. 4B, and FIG. 5, the operative states of the invention herein can be clearly understood, wherein:

FIG. 4A depicts the vehicle body in the motionless state of operation, during which time the slant-cut fan gear 311 of the treadle structure 3 is enmeshed with the slant-cut gear C (adjacent to the straight-cut gear A) of the gear assembly 4 and the straight-cut gear A of the gear assembly 4 is enmeshed to the straight-cut gear B of the transmission assembly 2, with the end of the treadle structure 3 slant-cut fan gear 311 situated against the arresting edge 15 of the base mount to control the ascending angle of the treadle rod 31.

FIG. 4B depicts the vehicle body in the ridden state of operation; when the treadle rod 31 is tamped slightly downwards, since the axial center of the locating element 41 is secured to the position limiting mount 14 of the base plate 1, the gear assembly 4 becomes slightly re-positioned such that the pitched tooth surfaces of the treadle structure 3 slant-cut fan gear 311 cause the movement of the slant-cut gear C to which it is enmeshed, with the straight-cut gear A of the gear assembly 4 in a state of enmeshment (at which time the gear assembly 4 is still not revolving) with the straight-cut gear B of the transmission assembly 2 giving rise to buffered travel.

When the treadle rod 31 is continuously peddled, the slant-cut fan gear 311 of the treadle structure 3 causes the slant-cut gear C and straight-cut gear A of the gear assembly 4 to synchronously rotate, at which time the straight-cut gear A of the gear assembly 4 is enmeshed with the straight-cut gear B of the transmission assembly 2, which in combination cause the revolution of the follower shaft 21 and synchronous rotation of the rear wheels D; furthermore, since a bearing is installed between the follower shaft 21 of the transmission assembly 2 and the rear wheels D, when the follower shaft 21 causes the vehicle body rear wheels to rotate, due to vehicle wheel inertia, whenever the follower shaft 21 rotates one revolution, the vehicle wheels continue to rotate to attain rapid forward performance.

In summation of the foregoing section, since the treadle-type vehicle body forward drive structure of the invention herein possesses unique structural features capable of achieving all the claimed objectives of the original innovation and, furthermore, significantly increases the usable performance of the conventional product, the present invention meets all new invention patent application requirements and is lawfully submitted for review and the granting of the commensurate patent rights in the spirit of encouraging a national spirit of innovation in accordance with the Patent Law.

What is claimed is:

1. A treadle vehicle body forward drive structure comprised of a base plate, a transmission assembly and a treadle structure installed onto the said base plate, a gear assembly enmeshing the said transmission assembly to the said treadle structure, and a position limiting plate that maintains the position of the drive structure on the said base plate, of which:

said base plate has respectively disposed on it a fixing mount and a bearing mount, wherein the center of the said fixing mount accommodates the insertion of the said treadle structure and installed in a bearing situated on the said bearing mount is the said transmission assembly; also projecting between the said two mounts is a fixing rod and a position limiting mount; situated on the said base plate at a coinciding position of a slant-cut fan gear of the said treadle structure is an arresting edge that positionally limits an ascending angle of a treadle rod and, furthermore, protruding from the ends of the said base plate are fastening mounts that provide for the insertion of screws into the through-holes of the said position limiting plate to achieve screw mounting, said transmission assembly consists of a follower shaft inserted over said base plate bearing mount and a straight-cut gear ensleeved over the said follower shaft; the ends of the said follower shaft projecting from the said position limiting plate are sleeved into wheel hub centers of the vehicle body rear wheels and capable of causing the said rear wheels to rotate, said treadle structure consists of said treadle rod sleeved onto the said base plate fixing mount, a torque spring with one end hooked onto a fastening mount of the said base plate and the other end hooked on the said treadle structure slant-cut fan gear, wherein the end of one extremity of the said treadle rod is situated against the said base mount arresting edge over the said slant-cut fan gear to positionally limit the ascending angle of the said treadle rod, with the other end of said treadle rod extending centrally from an elongated hole situated in a middle section of a vehicle body lower platform to thereby provide for treadling by a foot of the user; and, furthermore, when the said slant-cut fan gear is in a motionless state, its teeth enmesh with teeth of a slant-cut gear of the said gear assembly, said gear assembly is inserted on the said fixing rod of the said base plate and enmeshed with the said straight-cut gear the gear assembly of the said transmission assembly and the said slant-cut fan gear of the said treadle structure and, furthermore, a locating element is situated in between two gears of the gear assembly at their approximate axial centers and, furthermore, the said locating element is secured in a position limiting mount of the said base plate, but permits the said gear assembly to ascend and thereby give rise to buffered travel, said position limiting plate is sleeved onto the said follower shaft where it is installed in a bearing to facilitate the rotation of the said follower shaft; furthermore, fastening mounts of the said base plate are situated at the four end corners of the base plate, with each having a respective through-hole such that after the said screws are inserted, they are screwed into the said fastening mounts of the said base plate to attach and fix the said base plate to the said position limiting plate, when said treadle rod is tamped slightly downwards, the said slant-cut fan gear of the said treadle structure causes the said slant-cut gear and the said straight-cut gear of the said gear assembly to synchronously rotate, which in combination causes the revolution of the said follower shaft and the synchronous rotation of the said rear wheels; and, as such, provides the user riding pleasure and options, which is among the innovative features of the invention herein.

\* \* \* \* \*